Feb. 12, 1935.  W. W. WILLIAMS  1,991,185
CONTROL MECHANISM FOR FLUID FUEL BURNERS
Filed June 25, 1932    5 Sheets-Sheet 5
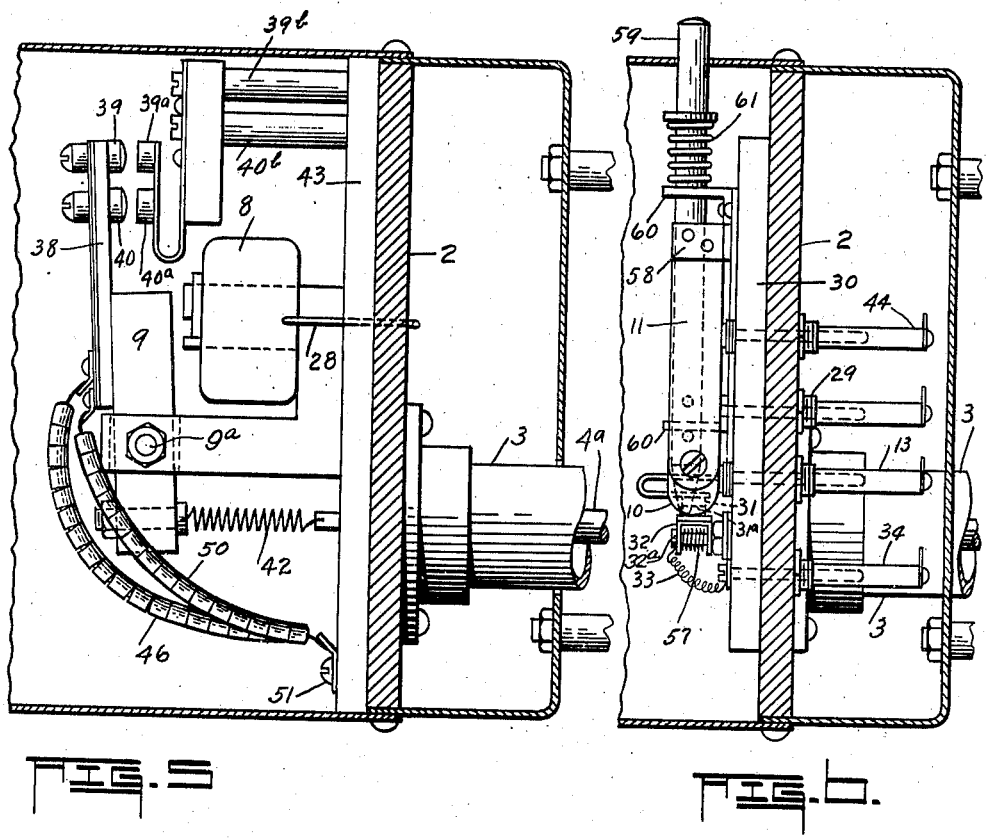
INVENTOR.
WALTER W. WILLIAMS
BY Langdon Moore
ATTORNEYS.

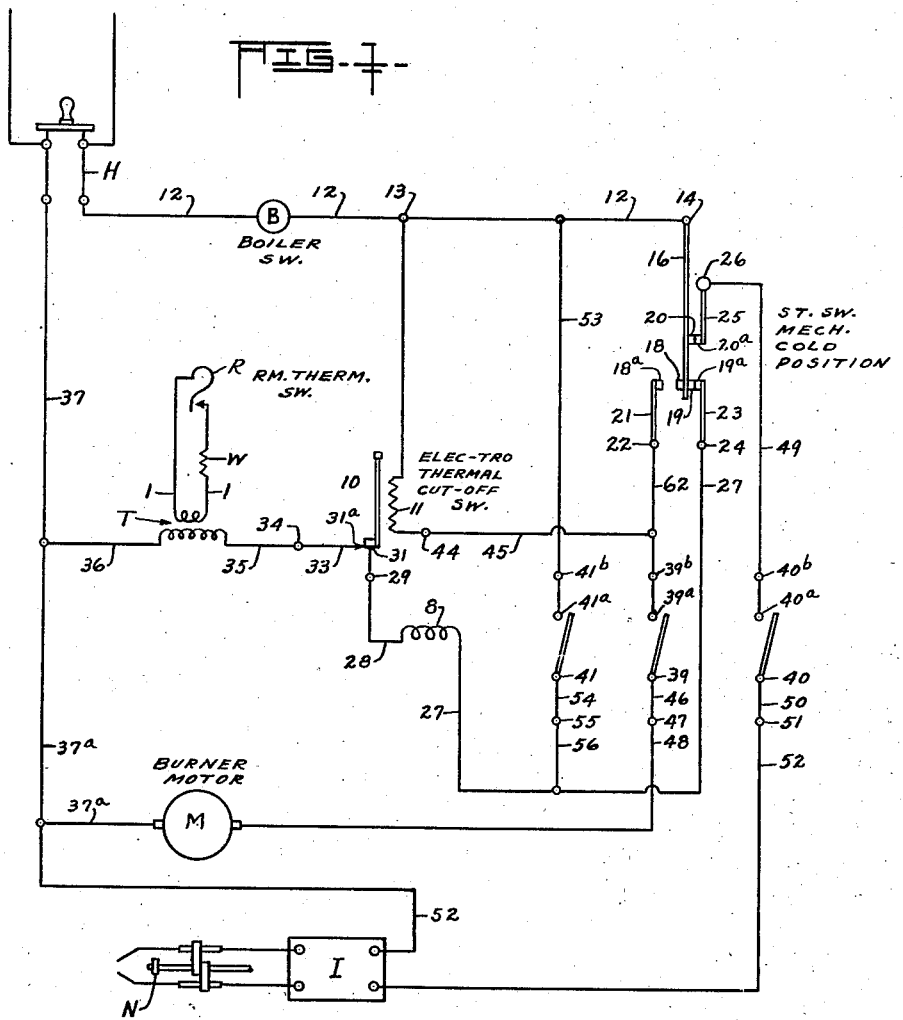

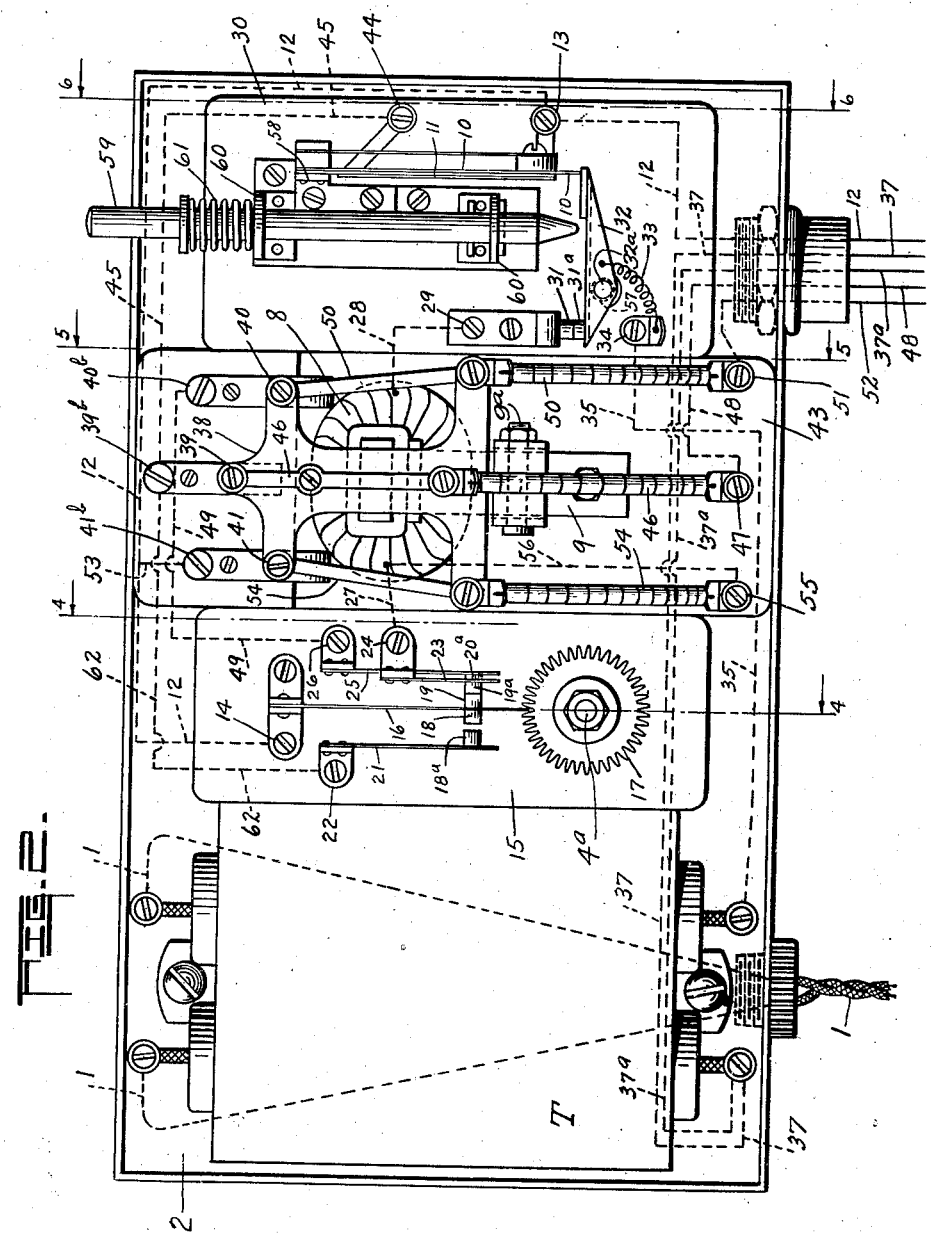

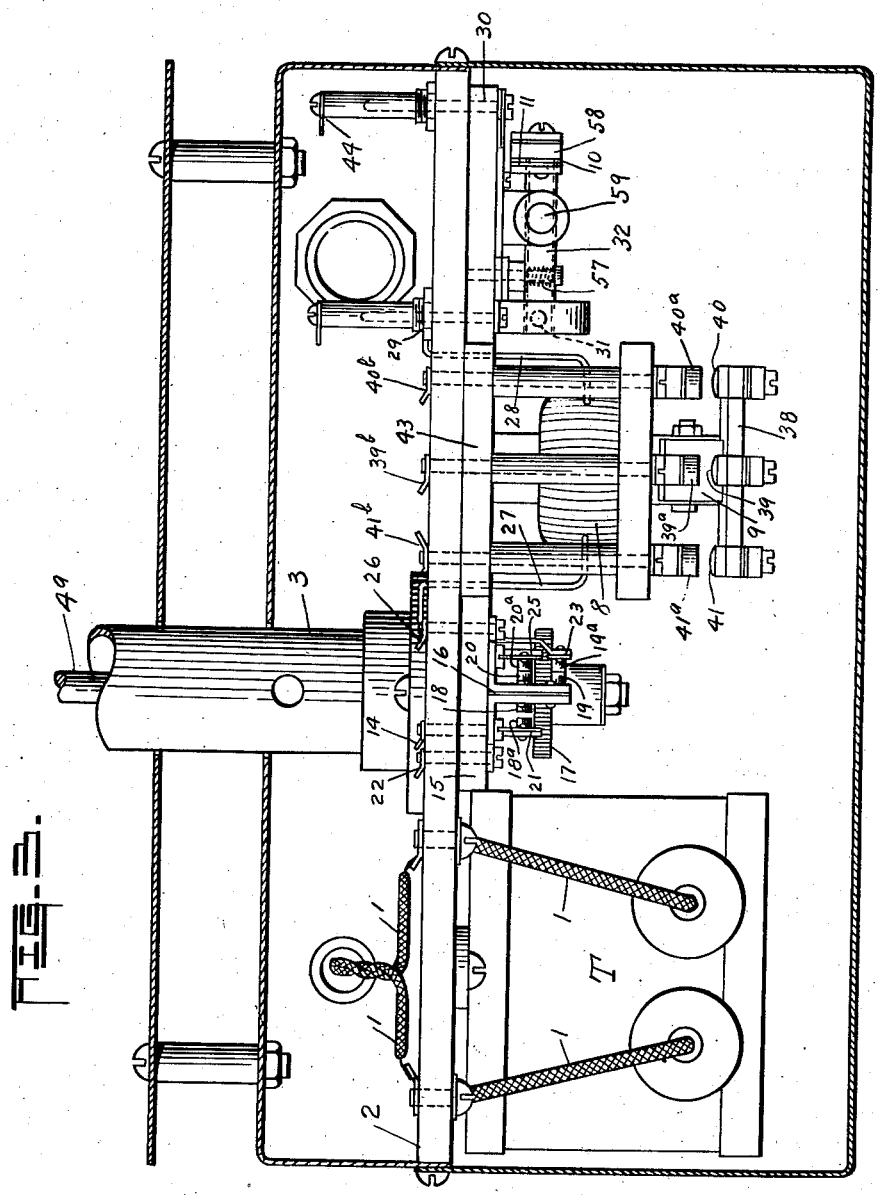

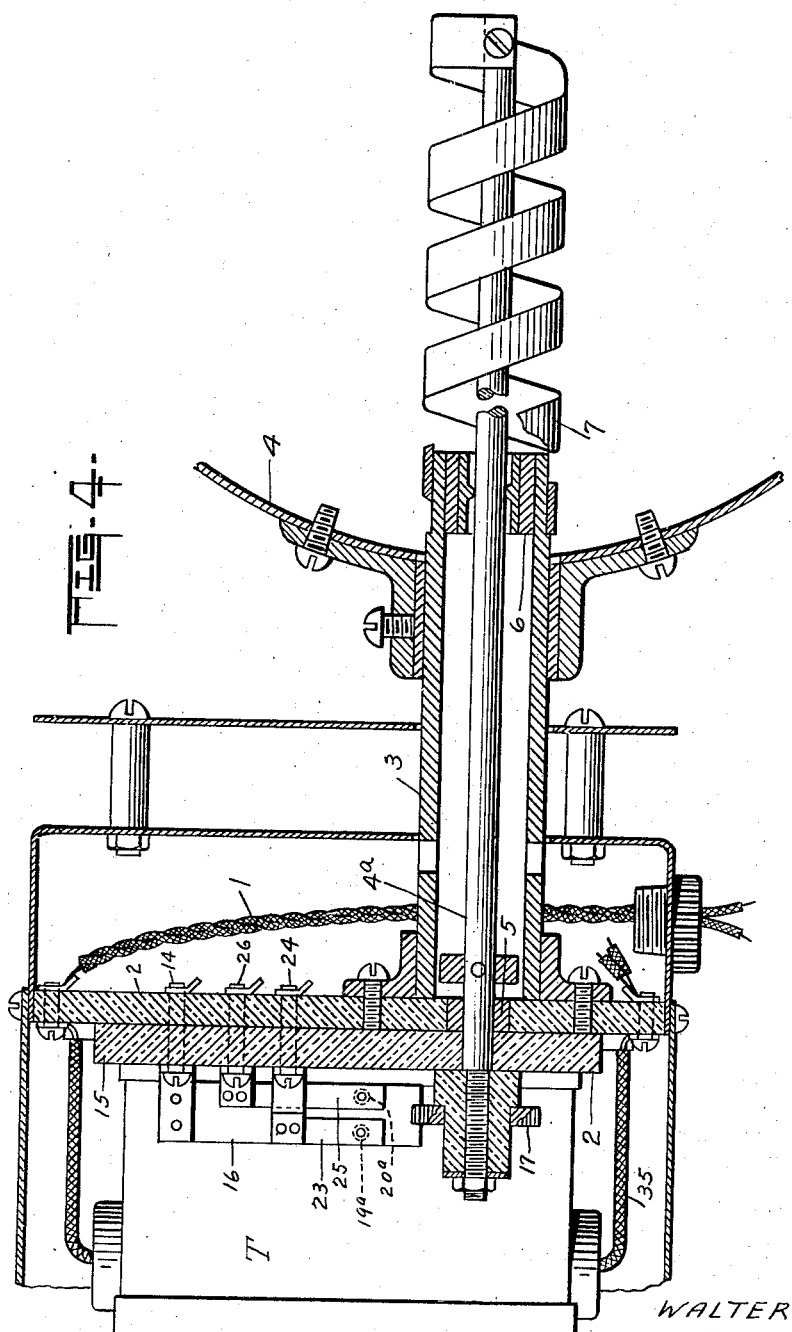

Patented Feb. 12, 1935

1,991,185

UNITED STATES PATENT OFFICE 1,991,185

CONTROL MECHANISM FOR FLUID FUEL BURNERS

Walter W. Williams, Bloomington, Ill.

Application June 25, 1932, Serial No. 619,225

2 Claims. (Cl. 158—28)

This invention relates to control mechanism and more particularly to mechanism of this character for use in connection with electrically operated and controlled fluid fuel burners.

It is an object of this invention to provide an automatic electrical control for an electrically operated fluid fuel burner mechanism which will be actuated by a thermostat to produce an even temperature in the room where the thermostat is located so that when the room temperature descends below the predetermined degree, the room thermostat closes the circuit which acts in conjunction with other devices to close the motor circuit of the burner mechanism causing fuel to be supplied and close the circuit through an ignition device to ignite said fuel and at the same time to close a circuit through a timing element which acts upon failure of combustion within a predetermined time thereafter to open the motor circuit and ignition circuit and upon establishment of combustion to allow the motor circuit to remain closed but open the circuit to the ignition device and shunt out the timing element.

It is another object of this invention to provide a step-down transformer in circuit with the room thermostat so that a minimum amount of voltage necessary to the operation is caused to pass through the room thermostat whereby the low voltage for the room thermostat allows the use of a twisted pair of wires, such as lamp cord, to be used in connecting the thermostat with the transformer which type of wire is allowed by the National Board of Fire Underwriters to be employed in the secondary circuit without conduit installation. It is another object of this invention to provide a resistance in the secondary circuit in series with room thermostat for limiting the current flow therethrough to compensate for different lengths of wire. It is another object of this invention to operate the other electrical devices directly from line voltage and to mount said devices in one unit which may preferably be located on the stack of the heater or furnace to which the oil burner mechanism is applied.

With these and other objects in view reference is made to the accompanying sheets of drawings with the understanding that minor detail changes may be made without departing from the scope thereof.

Figure 1 is a schematic wiring diagram illustrating an embodiment of this invention.

Figure 2 is a view in front elevation of the electrical control devices arranged upon a single panel, with the cover removed.

Figure 3 is a top plan view of Figure 2 illustrating the front and back covers in section.

Figure 4 is a transverse vertical sectional view taken on the line 4—4, looking in the direction of the arrows on Figure 2.

Figure 5 is a similar view taken on the line 5—5, looking in the direction of the arrows on Figure 2.

Figure 6 is a similar view taken on the line 6—6, looking in the direction of the arrows on Figure 2.

In the embodiment of this invention illustrated the room thermostat R is connected by the wires 1 to a step-down transformer T mounted preferably on the left-hand side of the panel 2 which panel also mounts what is commonly termed a stack switch mechanism C including a tubular member 3 mounted rigidly upon the back of the panel 2 and adapted to extend through and be secured upon the stack 4 leading from the domestic heater or furnace to which the fluid fuel burner is applied. The tubular member 3 encloses a rotatable shaft 4a mounted in bearings 5 and 6 in the panel 2 and the tubular member 3, respectively. The end of the shaft extending through the bearing 6 enters within the stack 4 and its extremity is connected to one end of a thermostatic coil 7, of commercial construction, the other end of which is fixed to the tubular member 3. This general construction is known in this art as a stack switch mechanism and the coil 7 will cause the shaft 4a to rotate first in one direction and then in the other as the temperature within the stack increases or decreases. The portion of the shaft 4a of the stack switch mechanism passing through the bearing 5 in the panel 2 is provided with mechanism hereinafter described, to close and open certain circuits upon rotation of said shaft. Mounted upon the panel 2, next adjacent the stack switch mechanism is a relay coil or electromagnet 8 having an armature 9 mounted on a pivot 9a adapted to close three separate circuits, hereinafter described, when the relay is energized. Mounted upon the right hand edge of the panel adjacent said relay is the timing element which includes a commercial thermostatic metal strip 10 surrounded by an electrical resistance 11, hereinafter described.

With the above general description in view and by referring to the schematic diagram of Figure 1, it is seen that the secondary circuit of the step-down transformer T is connected in series with the room thermostat R. This being a low voltage circuit, it is preferable to employ the commercial pair wires such as used for lamp cord in connecting the thermostat to the transformer as this type of wire is allowed by the National Board of Fire Underwriters without conduit installation which is a great saving in the cost of installation as at times the room thermostat is located at a considerable distance from the panel 2 which mounts the transformer T. In order to maintain a minimum low voltage and compensate for the variations in the length of the wires 1, it is preferable to place the desired resistance W in series in this circuit.

The commercial circuit enters the building and passes through a hand switch H. Commercial circuits are usually alternating current and this control is constructed for use with that type of current. The so-called hot wire 12 leads from the switch H to binding post 13 upon panel 2 and may include the customary boiler control B of commercial construction usually employed in domestic heaters connected in series therewith. The wire 12 is then continued to the binding post 14 upon the back of insulation 15 carrying the mechanism hereinbefore referred to for opening and closing certain circuits by the stack switch mechanism. The binding post 14 forms a part of the support for holding one end of the switch operating arm 16, the other end of which is free and is adapted to enter between adjacent teeth of the disk 17 carried upon the end of the rotatable shaft 4a of the stack switch mechanism to rotate therewith. The switch operating arm 16 is provided adjacent its free end with a contact member 18 upon one side and contact members 19 and 20 upon the other side which upon rotation of the toothed disk 17 in one direction will bring the contact 18 in engagement with the contact 18a preferably mounted upon a flexible strip 21, the upper end of which is mounted upon the panel 15 in conjunction with the binding post 22 and upon rotation in the opposite direction will cause the contact 19 to engage the contact 19a carried upon the lower end of the similar flexible strip 23, the upper end of which is mounted upon the panel 15 in conjunction with the binding post 24 and at the same time cause the contact 20 to engage the contact 20a carried upon another flexible strip 25 mounted upon the panel 15 in conjunction with the binding post 26. The binding post 24 is connected by the wire 27 to one pole of the relay coil 8, the other pole of which is connected by the wire 28 to binding post 29 mounted upon the insulated panel 30 in conjunction with the contact 31 which panel also mounts the binding post 13 and carries the timing element heretofore referred to. A pivoted switch arm 32 is mounted on a pivot 32a therebelow carrying a contact 31a adapted to be held in engagement with contact 31 when the strip 10 of the timing element is in engagement with the other end of the switch arm 32. The contact 31a is connected in circuit through the switch arm 32 and a flexible lead 33 to the binding post 34 mounted upon the panel 30 which in turn is connected by the wire 35 to one pole of the primary windings of the step-down transformer T, the other pole being connected by the wire 36 to the wire 37 leading back to the switch H in the commercial circuit. It is therefore seen that the primary of the transformer T is connected at all times in series with the commercial line. The impedance in the transformer when the secondary circuit is opened through the room thermostat is sufficient to prevent the operation of the relay 8.

The normal position of the stack switch mechanism causes the contacts 19 and 20 to normally engage the corresponding contacts 19a and 20a so that when the hand switch H is closed, the commercial current passes through wire 12, boiler control B, binding post 13, binding post 14, switch arm 16, contact 19, contact 19a, strip 23, binding post 24, wire 27, relay coil 8, wire 28, binding post 29, contacts 31 and 31a, lead 33, binding post 34, wire 35, transformer T, wire 36 and wire 37 to the other side of switch H.

From the wiring diagram in the above description is readily seen that when the secondary circuit is closed through the room thermostat, the impedance in the transformer is reduced and the current of the commercial line will flow freely therethrough and in so doing will energize the relay or electromagnet 8. The armature 9 of this magnet is provided with an extension 38 thereabove mounting three spaced apart contacts 39, 40 and 41 which are held out of engagement with complementary contacts 39a, 40a and 41a by a spring 42 and upon energization of the relay 8 the armature will be drawn toward it and close the circuits through the said contacts. The complementary contacts are preferably mounted upon resilient connectors held in conjunction with binding posts 39b, 40b and 41b respectively mounted upon the insulating panel 43.

From the above it is seen that the closing of the room thermostat energizes the relay coil 8 causing the contacts 39, 40 and 41 to engage the complementary contacts 39a, 40a and 41a. One end of the electrical resistance 11 surrounding the thermostatic metal strip 10 is connected to the binding post 13 and the other end to the binding post 44 upon the insulating panel 30. This binding post is connected by the wire 45 to the binding post 39b upon the insulating panel 43. The contact 39 is connected through the electrical conductor 46 to the binding post 47 below the armature 9 upon the insulating panel 43 which binding post is connected by wire 48 to one pole of the motor M, the other pole of which is connected by the way of 37a to the wire 37 returning the commercial current to the switch H. The binding post 40b is connected by the wire 49 to the binding post 26 upon the insulating panel 15 and the contact 40 is connected by the electrical conductor 50 to the binding post 51 upon the insulating panel 43 which in turn is connected by the wire 52 in series with the ignition transformer or igniting device I to the wire 37a leading through the wire 37 to the hand switch H. The wire 12 between binding posts 13 and 14 is connected by wire 53 to binding post 41b. The contact 41 is connected by the electrical conductor 54 to binding post 55 upon the insulating panel 43 which is connected by the wire 56 to the one pole of the relay coil 8.

From the above tracing of the circuits closed by contacts 39, 40 and 41 being brought into engagement with the complementary contacts 39a, 40a and 41a, it is seen that the resistance 11 is placed in series with the motor M and at the same time the ignition device I is energized to produce a spark in front of the nozzle N. Referring to Figures 2 and 6, the pivoted switch arm 32 is provided with a coil spring 57 normally acting to swing the arm to draw the contacts 31 and 31a out of engagement. The strip 10 of thermostatic metal is secured at its upper end by the bracket 58 to the insulating panel 30 and is so held when cold so that its lower free end will contact the end of the pivoted arm 32 to hold the complementary contacts 31 and 31a in engagement with each other. Therefore, if the resistance 11 remains in series in the motor circuit, it will cause the thermostatic strip 10 to deform, moving the lower free end out of engagement with the switch arm 32 whereby the circuit will be broken through the contacts 30 and 31a, and the circuit through relay coil 8 will be opened so that the spring 42 will rotate the armature 9, breaking the circuit to the motor and ignition device through contacts 39 and 40 respectively and the operation of the burner will cease. By employing the proper character of thermostatic metal and the proper number of turns of resistance the time required for the continuous passage of the current may be determined before the thermostatic strip deforms sufficiently to release the pivoted switch arm 32 and for this reason these elements are referred to as a timing element. After the motor circuit has been broken and the circuit through the relay opened, as above described, the thermostatic strip 10 will cool but will rest against or may be out of contact with the adjacent end of the pivoted switch arm 32. In order to return the contacts 31 and 31a in engagement, a hand re-set 59 is provided in the form of a plunger mounted to be reciprocated in the brackets 60 mounted upon the insulating panel 30 which hand re-set may be depressed against the spring 61 to engage and rotate the switch arm 32 to bring the contacts 31 and 31a into engagement and allow the free end of the thermostatic strip 10 to assume its normal position to maintain such engagement.

When the motor M and ingition device I are brought into commercial circuit by the operation of the relay 8 and ignition occurs, the heat from the burning oil will cause the stack switch mechanism to respond thereto whereby the toothed disk 17 will be rotated counterclock-wise, swinging the free end of the contact arm 16 toward the left and will bring contact 18 into engagement with contact 18a. The binding post 22 on the insulating panel 15 not only is connected to the contact 18a but is also connected by the wire 62 to the binding post 39b. After contacts 39, 40 and 41 have been closed and the switch arm 16 has been rotated sufficiently to open the contacts 19 and 20 after closing the circuit through contact 18, the relay 8 and the motor M will remain in the commercial circuit while the timing element heater 11 and ignition device I will be shunted out inasmuch as the opening of contact 19 opens the circuit through the wire 27 to the relay 8, but the closing of contact 41 maintains the circuit through wires 12 and 53 and conductor 54 and wire 56 through the relay 8, while opening of contact 20 opens the circuit through wire 49 and contact 40 and wire 52 to the ignition device I. It is preferable to mount the contacts 18a, 19a and 20a upon the resilient strips 21, 23 and 25 respectively in such a manner that upon the rotation of the toothed disk 17 in either direction, one set of contacts upon the switch arm 16 remains closed until after contact has been made between the complementary contacts on the other side of said switch arm. By this means it is seen that during the normal operation of the burner the relay will at all times remain in series with the commercial circuit.

When the burner functions normally to produce heat upon the closing of the room thermostat, it will continue to do so until the desired temperature is produced and the secondary circuit is opened through the room thermostat. The resulting impedance in the primary transformer T will be such that the relay coil 8 will be de-energized, its armature 9 will move contacts 39, 40 and 41 to open position and the motor M will cease operation and the burner mechanism will become idle, whereupon the stack switch mechanism responding to this condition will cause the toothed disk 17 to rotate clock-wise and return the switch mechanism controlled thereby to the position shown in Figure 2. Should the flame cease during normal operation from any cause, such as a failure of the oil supply or the nozzle becoming clogged, the stack switch mechanism will return the parts to the position shown in Figure 2, but the room thermostat being closed, the line current will pass through the timing element heater 11 and after a predetermined time will open the circuit through contacts 31 and 31a, as herebefore described. It is therefore seen that either upon a failure of initial ignition or upon a failure of ignition during normal operation, the timing element will cause the burner to shut down and it cannot be started again until the pivoted switch arm 32 is rotated by the depression of the hand reset 59 after the thermostatic strip 10 has cooled.

In Figure 1 the closing of the room thermostat R energizes the relay coil to close a circuit to the motor M which circuit at first includes the heating element 11 of the thermostatic lock-out switch 31—31A in the same circuit with the motor M and upon establishment of combustion, the rotation of the toothed disk 17 closes another circuit through the motor shunting out the said heating element 11.

It is further seen that by the use of a transformer in this manner, a thermostat or any type of switch may be employed to open and close a secondary circuit and the operation of a relay or motor would be controlled in the same manner as the devices employed herein without departing from the scope of this invention which also contemplates the employment of various types of transformers as well as the step-down one hereinbefore described, depending upon the ratio of the secondary to the primary current desired for the particular object to be accomplished.

What I claim is:

1. In an electrically operated and controlled fluid fuel burning mechanism, a source of electricity, a burner motor, a normally closed electro-thermal cut-out switch, electrically actuated means for opening said switch, a normally open motor switch, a normally open secondary switch controlling a holding circuit for the electrically actuated means, electrically actuated means to close the motor and secondary switches. a normally closed combustion switch, adapted to open upon establishment of combustion, a normally open combustion switch adapted to close upon establishment of combustion before the normally closed combustion switch opens, means for establishing, first, a circuit from the source through the normally closed combustion switch and actuating means to close the motor and secondary switches and the normally closed electro-thermal cut-out switch, second, a circuit from the source through the electro thermal-switch actuating means, closed motor switch and motor, and a circuit from the source through the closed secondary switch and motor switch actuating means and the normally closed electro-thermal cut-out switch, and means, upon establisment of combustion and thereafter upon the closing of the normally open combustion switch, establishing a circuit from the source through the then closed combustion switch, closed motor switch and motor which passes the current about the electro thermal switch actuating means.

2. In a mechanism having the characteristics specified in claim 1 and wherein an ignition device is included with a normally open ignition switch, adapted to be closed by the actuating means for closing the motor switch, and means establishing a circuit from the source through the normally closed combustion switch, ignition switch and ignition device to establish combustion of the fluid fuel.

WALTER W. WILLIAMS.